May 4, 1954     G. J. GOLUBICS     2,677,574
VEHICLE SEAT CONSTRUCTION
Filed March 12, 1952                     3 Sheets-Sheet 1

G. J. GOLUBICS
INVENTOR.

BY E. C. McRae
J. R. Faulkner
D. H. Oster
ATTORNEYS

May 4, 1954  G. J. GOLUBICS  2,677,574
VEHICLE SEAT CONSTRUCTION
Filed March 12, 1952  3 Sheets-Sheet 2

G. J. GOLUBICS
INVENTOR.

BY  E. C. McRae
J. R. Faulkner
D. H. Oster
ATTORNEYS

May 4, 1954  G. J. GOLUBICS  2,677,574
VEHICLE SEAT CONSTRUCTION
Filed March 12, 1952  3 Sheets-Sheet 3

G. J. GOLUBICS
INVENTOR.

BY *E. C. McRae*
*J. R. Faulkner*
*S. H. Oster*
ATTORNEYS

Patented May 4, 1954

2,677,574

UNITED STATES PATENT OFFICE 2,677,574

VEHICLE SEAT CONSTRUCTION

George J. Golubics, Detroit, Mich., assignor to Ford Motor Company, Dearborn, Mich., a corporation of Delaware Application March 12, 1952, Serial No. 276,069

5 Claims. (Cl. 296—66)

This invention relates generally to a vehicle seat construction and more particularly to a seat of the folding type for a combined passenger and luggage carrying vehicle.

An object of the present invention is to provide a folding seat for a combined passenger and luggage carrying vehicle such as a station wagon, in which the seat cushion and seat back may be swung forwardly to form part of a flat horizontal luggage rack, and in which the seat frame, seat cushion and seat back may be swung forwardly as a unit to provide space for the entrance of passengers into the vehicle rearwardly of the seat. Heretofore it has been customary, in station wagons of the type having front, intermediate and rear seats, for the intermediate seat to be considerably narrower than the body width at that point to provide sufficient space between the end of the seat and the adjacent wheelhouse for the passage of passengers into the rear seat. Such an intermediate seat can of necessity only accommodate two passengers. In the present invention the intermediate seating arrangement includes a two passenger seat and in addition a one passenger folding seat, thus accommodating three passengers in lieu of the usual two. The invention thus has for a principal object the provision of this added seating capacity while at the same time providing access to the rear seat.

Conventional station wagons incorporate intermediate and rear seats which may be folded flat to provide a horizontal luggage carrying rack in back of the front seat. The seating construction of the present invention not only provides additional seating capacity while permitting access to be had to the rear seat, but also can readily be arranged to provide an extension of the flat luggage carrying rack formed by the adjacent seat. To accomplish these objectives the folding seat of the present invention incorporates a main seat frame of tubular construction pivotally mounted near its forward end to supporting brackets secured to the vehicle floor panel. The extreme forward end of the main seat frame is pivotally connected to the forward end of an auxiliary frame for the seat cushion while the rearward end of the main seat frame is pivotally connected to the lower portion of an auxiliary seat frame for the seat back.

Other objects and advantages of this invention will be made more apparent as this description proceeds, particularly when considered in connection with the accompanying drawings, wherein.

Figure 1:
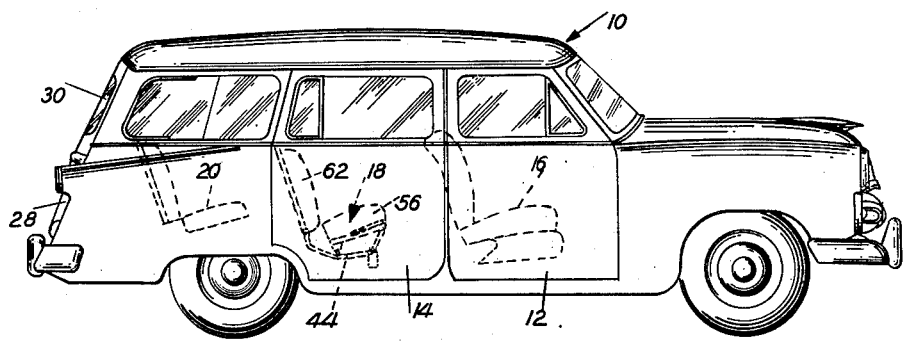
Figure 1 is a side elevational view of a vehicle incorporating the seat construction of the present invention.
Figure 2:
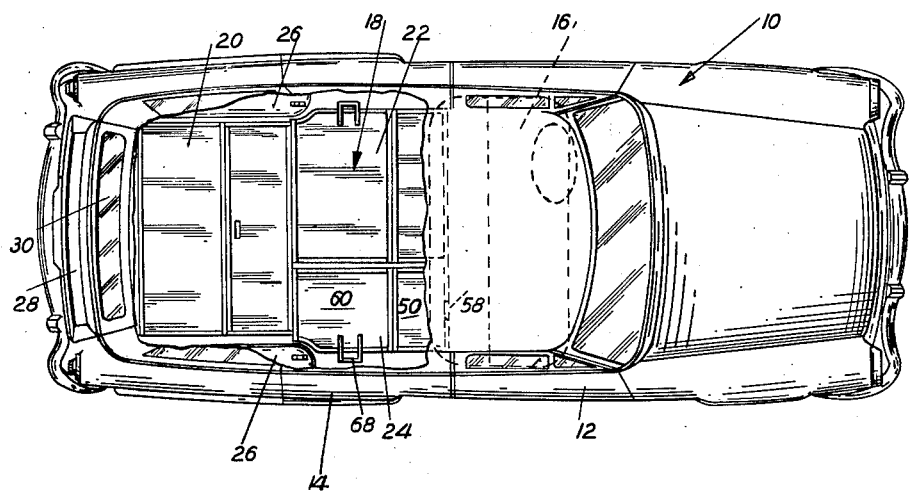
Figure 2 is a plan view of the vehicle shown in Figure 1, with the roof panel partly broken away to show the intermediate and rear seats in their luggage carrying positions.

Referring now to the drawings, and particularly to Figures 1 and 2, the reference character 10 indicates a station wagon having front and rear doors 12 and 14 respectively, and front, intermediate and rear seats 16, 18 and 20 respectively. The front seat 16 is a single three passenger seat. The intermediate seat 18 comprises a two passenger section 22 and a one passenger section 24, while the rear seat 20 is a single two passenger seat, the latter of necessity being narrower since it is located between the rear wheelhouse panels 26.

It will be noted that provision is thus made for eight passengers, or nine if three are crowded into the rear seat 20. Customarily the intermediate seat of a station wagon is a single seat somewhat narrower than the vehicle body at this point since space must be left between the seat and the adjacent wheelhouse to provide access to the rear seat. By providing a one passenger folding intermediate seat 24 adjacent the two passenger intermediate seat 22, the vehicle capacity is increased by one and at the same time provision is made for convenient entrance of passengers into the rear seat.

Figure 2 illustrates the station wagon 10 with the intermediate and rear seats folded down to provide a flat luggage carrying rack behind the front seat 16 and extending the entire interior width of the vehicle as well as rearwardly to the rearward end of the vehicle. Access to the luggage rack is of course provided by a conventional tail gate 28 and lift gate 30. It will be noted that the single intermediate seat 24, when folded to its luggage carrying position as shown in Figure 2, provides an extension of the luggage rack formed by the double intermediate seat 22, thus enabling the entire width of the vehicle body to be utilized for the carrying of luggage.

Reference is now made to Figures 3 to 7 inclusive, which illustrate the single intermediate seat 24 in its various positions.

Figure 3:
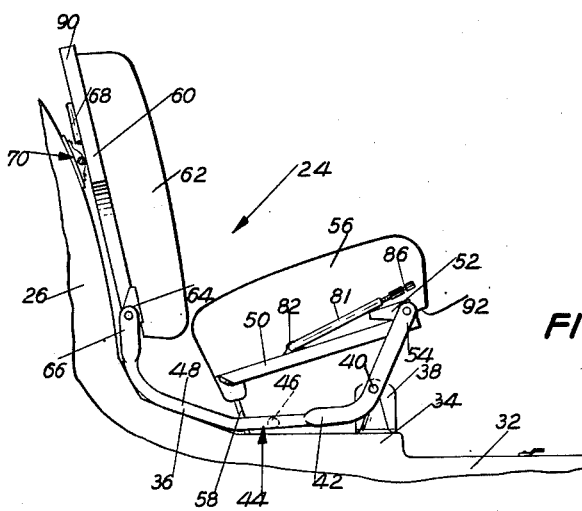
Figure 3 is a side elevational view of the vehicle seat of the present invention, in passenger carrying position.

In Figure 3 the seat 24 is illustrated in its normal passenger carrying position upon the floor panel 32. The floor panel 32 is provided with a raised step 34 which merges with an upwardly inclined portion 36 which in turn joins with the wheelhouse 26. A pair of supporting brackets 38 are mounted upon the step portion 34 of the floor panel 32 adjacent the forward edge of the step and at opposite sides of the seat 24. Pivotally connected to the supporting brackets 38 by pivot pins 40 are the tubular side members 42 of the main frame 44 of the seat. The two side rails 42 of the seat frame are interconected by a transverse connecting tubular member 46, suitably welded thereto. It will be noted that the central portion of each tubular side member 42 of the seat frame corresponds generally in shape to the shape of the floor panel, and that the portions 48 of the side members rest upon the inclined portion 36 of the floor panel.

The seat cushion for the seat 24 comprises an auxiliary seat frame 50 formed at its forward end with a reinforcing flange 52 and pivotally mounted by means of pivot pins 54 to the forward ends of the side rails 42 of the main seat frame 44. A conventional upholstered spring cushion 56 is carried by the auxiliary seat frame 50. Depending from the rearward edge of the auxiliary seat frame 50 is a fixed leg 58 which, in the position shown in Figure 3, rests upon the raised portion 34 of the floor panel and supports the seat cushion.

Figure 8:
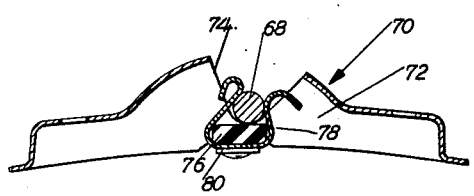
Figure 8 is an enlarged cross sectional view through the retainer and stop assembly mounted on the wheelhouse panel.

The seat back for the seat 24 comprises an auxiliary seat frame 60 supporting a conventional upholstered spring cushion 62. Adjacent its lower end the auxiliary frame 60 is provided with a reinforcing bracket 64 which is pivotally connected by means of pivot pins 66 to the upwardly extending rearward portions of the side rails 42 of the main seat frame 44. The auxiliary seat frame 60 is also provided with a U-shaped handle 68 which extends outwardly therefrom toward the outer side of the vehicle body. The handle 68 not only forms a convenient handle for manipulating the seat back but also is arranged to cooperate with a combined stop and retainer assembly 70 mounted upon the forward face of the adjacent wheelhouse 26. This assembly 70 comprises a housing 72, the opposite sides of which are notched as at 74, as best shown in Figure 8. A rubber bumper pad 76 is cemented to a retaining clip 78 provided with flanges 80 secured to the housing 72. The spring retaining clip 76 is arranged to receive and releasably retain one leg of the U-shaped handle 68 secured to the seat back frame while the rubber bumper pad 74 cushions the movement of the seat back.

Figure 4:
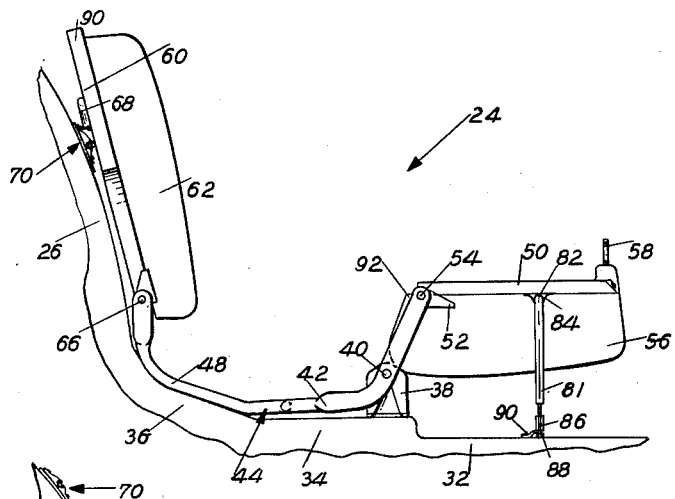
Figure 4 is a side elevational view similar to Figure 3, but showing the seat cushion swung forwardly as the first step toward placing the seat in its luggage carrying position.
Figure 5:
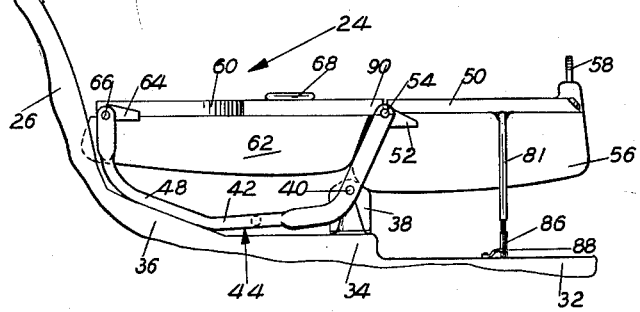
Figure 5 is a side elevational view similar to Figure 4, but illustrating the seat back swung forwardly to complete the movement of the seat to its luggage carrying position.
Figure 6:
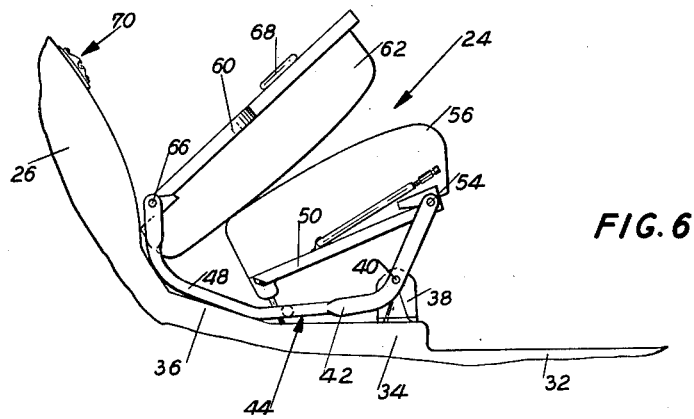
Figure 6 is a side elevational view similar to Figure 3, but showing the seat back swung forwardly from the position shown in Figure 3 as the first step in swinging the entire seat out of the way to provide access to the rear seat.
Figure 7:
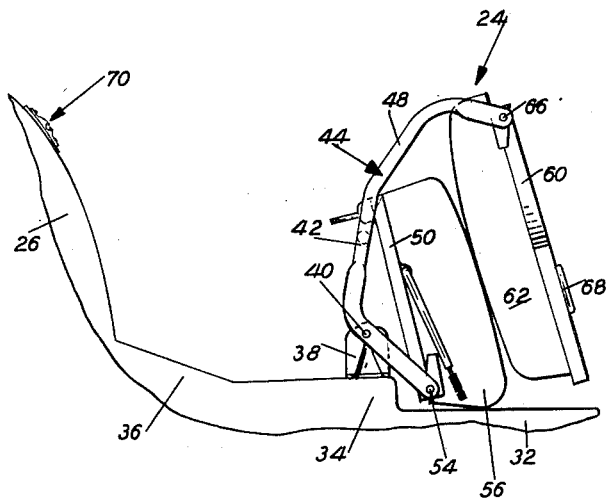
Figure 7 is a side elevational view similar to Figure 6, but illustrating the entire seat assembly swung forwardly from the position shown in Figure 6 to complete the movement of the seat to a position providing access to the rear seat.

As previously discussed, the seat 24 may be moved to a first position in which the auxiliary seat frames for the seat cushion and seat back form a level luggage carrying rack horizontally aligned with the luggage carrying rack formed by the seats 20 and 22, and to a second position in which the entire seat assembly is swung forwardly to provide room for the entrance of passengers into the vehicle body rearwardly of the intermediate seats 22 and 24. Figures 4 and 5 illustrate the successive steps taken to place the seat in the first position while Figures 6 and 7 show the successive steps taken to place the seat in the second position.

Referring now to Figures 4 and 5, in Figure 4 the seat cushion 56 is shown in an inverted position, having been swung in a clockwise direction around the pivot pins 54 interconnecting the auxiliary seat frame 50 and the side rails 42 of the main seat frame 44. To support the seat cushion in the position shown in Figure 4, a pair of folding legs 81 are provided. The two legs 81 may be integrally formed and joined by an intermediate connecting portion 82 extending transversely of the seat between the seat frame 50 and the cushion 56. The U-shaped leg unit 81—82 is journaled in ears 84 extending outwardly from the frame 50 to permit the legs to be swung from the position shown in Figure 3 to the position shown in Figure 4. The legs 81 are provided with studs 86 threaded into their ends to permit adjustment to level the seat frame 50 if necessary into alignment with the other parts of the luggage rack.

Figure 9:
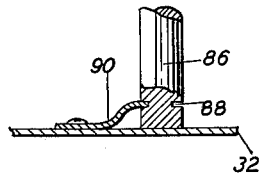
Figure 9 is an enlarged cross sectional view of part of the seat construction.

As best seen in Figure 9, the studs 86 are formed with annular grooves 88 adjacent their extremities for engagement with small clips 90 secured to the floor panel 32. The clips 90 not only locate the legs 81 in proper vertical position but also releasably retain the seat cushion against upward movement. The legs 81 can readily be swung to inoperative positions adjacent the sides of the seat cushion 56, as shown in Figure 3, when the seat cushion is returned to its normal passenger position. It will be noted that the fixed leg 58 of the seat cushion frame 50 extends upwardly in the position shown in Figure 4 to provide a convenient handle facilitating the movement of the seat cushion.

With the reference now to Figure 5, the second step in moving the seat 24 to its luggage carrying position is to swing the seat back frame 60 and cushion 62 carried thereby in a clockwise direction about the axis formed by the pivot pins 66. The upper end 90 of the auxiliary seat back frame 60 extends slightly beyond the cushion 62 to form a projecting flange engageable with the notched portion 92 of the seat cushion frame 50 to provide a stop therefor and to insure proper horizontal alignment between the seat back frame and seat cushion frame when they are in the luggage carrying position as shown in Figure 5. The handle 68 secured to the seat back frame 60 provides a convenient means for returning the seat back to its upright position as well as forming part of the latch for holding the seat back in its vertical position.

Reference is now made to Figures 6 and 7 which illustrate the steps required to move the seat 24 to a position permitting the passage of passengers into the rearward portion of the station wagon. Figure 6 shows the seat back frame 60 and the seat back cushion 62 carried thereby swung forwardly from the position shown in Figure 3 to a position in which the seat back cushion 62 rests against the seat cushion 56. This swinging movement takes place about the axis formed by the pivot pins 66, and it will be noted that the main seat frame 44 has remained in its original position during this step. The next step is to swing the main seat frame 44 about its pivotal connections 40 with the supporting brackets 38 to the position shown in Figure 7. During this step the entire seat moves as a unit since the seat back and seat cushion are carried by the main frame 44. The engagement between the seat cushion 56 and the seat back cushion 62 is maintained throughout this movement and the engagement of the seat back cushion 62 with the floor panel 32 limits the forward movement of the seat as well as forming a cushion therefor. It will be apparent that adequate space is now provided between the seat 24 and the wheelhouse 26 to permit passengers to enter the vehicle and to gain access to the rear seat 20 of the station wagon. To return the seat to its normal position the procedure is simply reversed. The entire assembly is first swung rearwardly about the pivotal connections 40 until the portions 48 of the main seat frame engage the inclined portion 36 of the floor panel. Subsequently the seat back frame 60 and cushion 62 are swung rearwardly about the pivot pins 66 until the handle 68 snaps into engagement with the spring clip 78 carried by the retainer 70.

It will be apparent from the foregoing that the seat shown in the drawings enables the passenger carrying capacity of the station wagon to be increased by one without impairing the luggage carrying capacity of the vehicle and without hindering the access of passengers to the rear seat. In fact, the luggage carrying capacity of the vehicle is increased since the single intermediate seat forms an extension of the luggage rack formed by the other seats and provides luggage carrying capacity the entire width of the vehicle. If desired, of course, the principle of the seat 24 could be embodied in a wider double seat or even in a seat extending the entire width of the vehicle.

It will be understood that the invention is not to be limited to the exact construction shown and described, but that various changes and modifications may be made without departing from the spirit and scope of the invention, as defined in the appended claims.

What is claimed is:

1. A seat for a combined passenger and luggage carrying vehicle, comprising, a supporting bracket mounted upon said vehicle, a main frame pivotally mounted intermediate its ends upon said supporting bracket, an auxiliary seat frame pivotally connected at its forward end to the forward end of said main frame, an auxiliary seat back frame pivotally connected at its lower end to the rearward end of said main frame, said auxiliary seat frame and said auxiliary seat back frame being swingable forwardly about their pivotal connections to said main frame to horizontally aligned positions forming a luggage supporting rack, and said main and auxiliary frames being swingable forwardly as a unit to provide space for entrance of passengers into said vehicle rearwardly of said seat.

2. In a combined passenger and luggage carrying vehicle having a side door and a floor panel, a supporting bracket mounted upon said floor panel adjacent said side door, a main seat frame pivotally mounted adjacent its forward end upon said supporting bracket and having a part rearwardly of said pivotal connection supported upon said floor panel, said main frame having an upwardly extending marginal flange forwardly of said pivotal connection and an upwardly extending marginal flange rearwardly of said part, an auxiliary seat frame, a cushion supported upon said auxiliary seat frame, means pivotally connecting the forward portion of said auxiliary seat frame to said forward marginal flange of said main frame, a fixed leg extending from the rearward end of said auxiliary seat frame and engageable with said floor panel, a folding leg pivotally mounted upon said auxiliary seat frame intermediate the ends of the latter and swingable from a position adjacent the side of said seat cushion to a position at right angles to said auxiliary seat frame, an auxiliary seat back frame, a cushion carried by said auxiliary seat back frame, means pivotally connecting the lower end of said seat back frame to the rearward marginal flange of said main frame, said auxiliary seat frame and said auxiliary seat back frame being swingable in a forward direction about their pivotal connections to the opposite extremities of said main frame to horizontally aligned positions forming a luggage supporting rack, and said main and auxiliary frames and the cushions carried thereby being swingable in a forward direction as a unit to provide space for the entrance for passengers into the vehicle rearwardly of said seat.

3. The structure defined by claim 2 which is further characterized in that the rearward edge of said auxiliary seat frame is provided with a ledge and the upper edge of said auxiliary seat back frame is provided with an overhanging portion engageable with said ledge in the luggage carrying positions of the frame to provide a support for the auxiliary seat back frame and to insure alignment between said frames, and a retaining unit mounted upon said vehicle body adjacent the auxiliary seat back frame in the passenger carrying position of the latter engageable with said seat back frame.

4. A seat for a combined passenger and luggage carrying vehicle, comprising, a supporting bracket mounted upon said vehicle, a main frame pivotally mounted intermediate its ends upon said supporting bracket, an auxiliary seat frame pivotally connected at its forward end to the forward end of said main frame, a fixed leg secured to said auxiliary seat frame near its rearward end to support said seat frame in its passenger carrying position, an auxiliary seat back frame pivotally connected at its lower end to the rearward end of said main frame, said auxiliary seat frame and said auxiliary seat back frame being swingable forwardly about their pivotal connections to said main frame to horizontally aligned positions forming a luggage supporting rack, a folding leg pivotally mounted upon said auxiliary seat frame near its rearward end swingable to a vertical position supporting said seat frame in its inverted luggage carrying position, and said main and auxiliary frames being swingable forwardly as a unit to provide space for the entrance of passengers into said vehicle rearwardly of said seat.

5. A seat for a combined passenger and luggage carrying vehicle, comprising, a supporting bracket mounted upon said vehicle, a main frame pivotally mounted intermediate its ends upon said supporting brackets, an auxiliary seat frame pivotally connected at its forward end to the forward end of said main frame, an auxiliary seat back frame pivotally connected at its lower end to the rearward end of said main frame, said auxiliary seat frame and said auxiliary seat back frame being swingable forwardly about their pivotal connections to said main frame to horizontally aligned positions forming a luggage supporting rack, a folding leg pivotally mounted upon said auxiliary seat frame near its rearward end and swingable to a position substantially at right angles to said seat frame to support the latter in its inverted luggage carrying position, a retaining stop member mounted upon the floor of said vehicle, said folding leg and said retaining member having interlocking portions releasably holding said seat frame in its luggage carrying position, and said main and auxiliary frames being swingable forwardly as a unit to provide space for entrance of passengers into said vehicle rearwardly of said door.

References Cited in the file of this patent

UNITED STATES PATENTS

| Number | Name | Date |
|---|---|---|
| 2,304,199 | Pinnow | Dec. 8, 1942 |